United States Patent
Kim et al.

(10) Patent No.: US 8,525,780 B2
(45) Date of Patent: Sep. 3, 2013

(54) METHOD AND APPARATUS FOR INPUTTING THREE-DIMENSIONAL LOCATION

(75) Inventors: Sang-hyoun Kim, Seoul (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1017 days.

(21) Appl. No.: 12/245,947

(22) Filed: Oct. 6, 2008

(65) Prior Publication Data

US 2009/0201289 A1 Aug. 13, 2009

(30) Foreign Application Priority Data

Feb. 12, 2008 (KR) .................. 10-2008-0012613

(51) Int. Cl.
*G06F 3/33* (2013.01)

(52) U.S. Cl.
USPC ........... 345/157; 345/158; 345/160; 345/163; 345/165; 345/167

(58) Field of Classification Search
USPC ......... 345/8, 156–184, 419, 660, 33; 725/52; 342/180, 192, 204; 348/569; 702/159
See application file for complete search history.

(56) References Cited

U.S. PATENT DOCUMENTS

| | | | | |
|---|---|---|---|---|
| 5,577,176 A | * | 11/1996 | Friedman et al. | 345/427 |
| 5,689,628 A | * | 11/1997 | Robertson | 345/427 |
| 5,977,979 A | * | 11/1999 | Clough et al. | 345/422 |
| 6,097,393 A | * | 8/2000 | Prouty et al. | 345/419 |
| 6,295,051 B1 | * | 9/2001 | Kanevsky et al. | 345/163 |
| 6,320,589 B1 | * | 11/2001 | Carraro et al. | 345/473 |
| 6,414,677 B1 | * | 7/2002 | Robertson et al. | 345/419 |
| 6,636,199 B2 | * | 10/2003 | Kobayashi | 345/158 |
| 6,781,576 B2 | * | 8/2004 | Tamura | 345/173 |
| 7,268,781 B2 | * | 9/2007 | Nomura et al. | 345/427 |
| 7,683,883 B2 | * | 3/2010 | Touma et al. | 345/163 |
| 7,755,608 B2 | * | 7/2010 | Chang et al. | 345/157 |
| 7,830,360 B2 | * | 11/2010 | Jeng et al. | 345/156 |
| 7,839,385 B2 | * | 11/2010 | Hunleth et al. | 345/158 |
| 8,121,717 B2 | * | 2/2012 | Idaka et al. | 700/98 |
| 8,194,036 B1 | * | 6/2012 | Braun et al. | 345/157 |
| 2001/0050672 A1 | * | 12/2001 | Kobayashi | 345/158 |
| 2002/0133310 A1 | * | 9/2002 | Tamura | 702/139 |
| 2004/0046736 A1 | * | 3/2004 | Pryor et al. | 345/156 |
| 2006/0033713 A1 | * | 2/2006 | Pryor | 345/158 |
| 2006/0036163 A1 | * | 2/2006 | Viswanathan | 600/424 |
| 2006/0061571 A1 | * | 3/2006 | Nomura et al. | 345/427 |
| 2007/0040800 A1 | * | 2/2007 | Forlines et al. | 345/158 |
| 2008/0024454 A1 | * | 1/2008 | Everest | 345/173 |
| 2008/0122839 A1 | * | 5/2008 | Berglund et al. | 345/420 |
| 2009/0048710 A1 | * | 2/2009 | DeLine | 700/232 |

* cited by examiner

*Primary Examiner* — Prabodh M Dharia
(74) *Attorney, Agent, or Firm* — Sughrue Mion, PLLC

(57) ABSTRACT

Provided are a method and apparatus for inputting a three-dimensional (3D) location. The method determines whether a control signal for moving a pointer existing at a point in a two-dimensional (2D) coordinate plane is a 3D movement signal for moving the pointer into a 3D space; and based on a result of the determination, the method selectively moves the pointer to a point in the 3D space existing in a direction perpendicular to the 2D coordinate plane, according to the control signal.

23 Claims, 6 Drawing Sheets

METHOD AND APPARATUS FOR INPUTTING THREE-DIMENSIONAL LOCATION

CROSS-REFERENCE TO RELATED PATENT APPLICATION

This application claims the benefit of Korean Patent Application No. 10-2008-0012613, filed on Feb. 12, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to location input, and more particularly, to a method and apparatus for inputting a three-dimensional (3D) location.

2. Description of the Related Art

Due to the development of image processing technology, a two-dimensional (2D) image technology is substituted by a three-dimensional (3D) image technology. Users can watch more realistic images by realizing a 3D image according to the 3D image technology. In this regard, due to the development of the 3D image technology, there is an increasing demand for a method of inputting a 3D location.

Conventionally, in order to input the 3D location, an input apparatus transmitting an ultrasonic signal and three sensors receiving the ultrasonic signal have been used. The three sensors are used to measure 3D coordinates of an X-axis, a Y-axis, and a Z-axis. According to a location of the input apparatus, a time taken for the ultrasonic signal transmitted from the input apparatus to reach each of the three sensors differs. Each of the three sensors calculates the time taken with respect to the ultrasonic signal, and determines the 3D location desired by a user, according to a value obtained from the calculation. The determined 3D location is output to a display unit displaying a 3D image, and displayed to the user.

Another conventional method of inputting the 3D location is to use a touch screen which separately has an additional device and which is enabled to receive 2D coordinates. First, a user touches the touch screen by using a touch pen, thereby deciding the 2D coordinates. After that, the user presses the touch pen, thereby moving a cursor in a depth direction. Otherwise, an angle between the touch pen and the touch screen is measured so that the cursor is moved in a direction at which the corresponding angle can be maintained. In this case, a separate additional device capable of detecting a press force and a separate additional device capable of measuring the angle have to be installed in the touch screen.

In this manner, in order to input the 3D location by using the conventional techniques, the additional devices such as the ultrasonic sensor or the press force sensor are required, as well as a 2D location input apparatus. However, these additional devices such as the sensors are expensive, and users cannot input the 3D location unless they install the additional devices in an existing 2D input apparatus or unless they separately purchase a 3D input apparatus.

SUMMARY OF THE INVENTION

The present invention provides a method and apparatus for inputting a three-dimensional (3D) location by using a two-dimensional (2D) location input apparatus.

According to an aspect of the present invention, there is provided a method of inputting a 3D location, the method including the operations of determining whether a control signal for moving a pointer existing at a point in a 2D coordinate plane is a 3D movement signal for moving the pointer into a 3D space; and based on a result of the determining, selectively moving the pointer to a point in the 3D space existing in a direction perpendicular to the 2D coordinate plane, according to the control signal.

The operation of determining may include the operation of determining whether the control signal is the 3D movement signal according to whether the control signal corresponds to a movement of the pointer following a predetermined trace.

The operation of determining may further include the operation of determining whether the control signal is the 3D movement signal according to whether the control signal corresponds to the movement of the pointer in a threshold range.

The operation of determining may further include the operation of determining whether the control signal is the 3D movement signal according to whether a 3D image is displayed when the control signal is input.

The operation of determining may further include the operation of determining whether the control signal is the 3D movement signal according to whether the movement of the pointer corresponding to the control signal is repeatedly performed in the predetermined trace over the threshold number of times.

The predetermined trace may be at least one of a circular trace and a rectilinear trace.

The operation of moving may include the operations of, when the control signal corresponds to the movement of the pointer following the rectilinear trace in a left and right direction, moving the pointer to a point in the 3D space existing in a positive direction perpendicular to the 2D coordinate plane; and, when the control signal corresponds to the movement of the pointer following the rectilinear trace in a up and down direction, moving the pointer to a point in the 3D space existing in a negative direction perpendicular to the 2D coordinate plane.

The operation of moving may include the operations of, when the control signal corresponds to the movement of the pointer following the circular trace in a clockwise direction, moving the pointer to a point in the 3D space existing in a positive direction perpendicular to the 2D coordinate plane; and, when the control signal corresponds to the movement of the pointer following the circular trace in a counterclockwise direction, moving the pointer to a point in the 3D space existing in a negative direction perpendicular to the 2D coordinate plane.

The operation of moving may include the operation of, when the control signal is determined not to be the 3D movement signal, moving the pointer along the 2D coordinate plane according to the control signal.

The method may further include the operations of receiving a selection signal for selecting an object that is one of a plurality of selectable objects in a displayed image; determining whether the object exists at a location where the pointer exists; and when the object exists at the location where the pointer exists, selecting the object, and when the object does not exist at the location where the pointer exists, moving the pointer to a predetermined location in the 2D coordinate plane.

The method may further include the operation of generating the control signal according to an input to a touch screen comprising a touch surface on which an image is displayed and a sensor detecting a contact with the touch surface.

According to another aspect of the present invention, there is provided a 3D location input apparatus for inputting a 3D location, the 3D location input apparatus including a determination unit determining whether a control signal for moving a pointer existing at a point in a 2D coordinate plane is a 3D movement signal for moving the pointer into a 3D space; and a pointer movement unit, based on a result of the determining, selectively moving the pointer to a point in the 3D space existing in a direction perpendicular to the 2D coordinate plane, according to the control signal.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
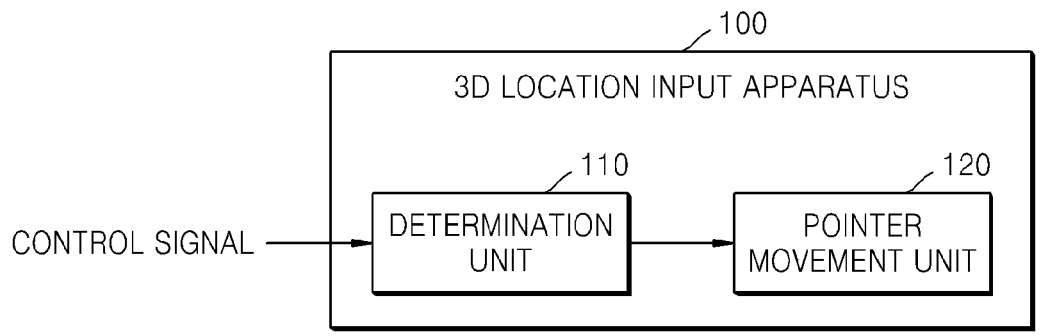
FIG. 1 is a block diagram of an apparatus for inputting a three-dimensional (3D) location according to an embodiment of the present invention.

FIG. 1 is a block diagram of an apparatus for inputting a three-dimensional (3D) location according to an embodiment of the present invention.

The apparatus for inputting the 3D location (hereinafter, referred to as 'a 3D location input apparatus 100') according to the present invention includes a determination unit 110 and a pointer movement unit 120.

The determination unit 110 determines whether an input control signal is a 3D movement signal for moving a pointer into a 3D space. The control signal may be a signal for moving the pointer located at a point on a two-dimensional (2D) coordinate plane, and may be generated in correspondence with an external input.

The 3D location input apparatus 100 may further include an interface (not shown) for generating the control signal by receiving the external input. The interface (not shown) may be embodied as any equipment such as a mouse, a joystick, and a touch screen by which a location may be input. In the present invention, for convenience of description, it is assumed that the 3D location input apparatus 100 employs the touch screen as the interface (not shown). The touch screen includes a touch surface on which an image is displayed, and a touch sensor detecting an input due to contact with the touch surface. In particular, the touch surface may be flat such as a rectangular shape, or may be spherical such as a terrestrial globe.

The pointer movement unit 120 selectively moves the pointer to a point in the 3D space, according to a result of the determination by the determination unit 110.

The pointer movement unit 120 comprises a 3D location movement unit (not shown) and 2D location movement unit (not shown). When the control signal is determined to be the 3D movement signal, the 3D location movement unit moves the pointer to a point in the 3D space existing in a direction perpendicular to the 2D coordinate plane. However, when the control signal is determined not to be the 3D movement signal, the 2D location movement unit moves the pointer along the 2D coordinate plane, according to the control signal. In the present invention, the 3D movement signal represents the control signal for moving the pointer into the 3D space.

Hereinafter, operations of the 3D location input apparatus 100 will now be described.

When a user touches a point on a touch surface by using a touch device (or, a finger), coordinates of the touched point is recognized, thereby locating the pointer. Hereinafter, the following description is not limited to the operation of the touch device as the present invention also includes the use of a finger in lieu of a touch device. Thus, in the beginning, the touch surface is the 2D coordinate plane, and the point on the touch surface touched by the user is a current location of the pointer in the 2D coordinate plane.

When the user manipulates the touch device, a control signal corresponding to an input is generated, and the location of the pointer is moved according to the control signal. At this time, the determination unit 110 determines that the control signal corresponding to a specific input from the user is a 3D movement signal, thereby moving the pointer to a point in a 3D space. The determination unit 110 may determine the control signal to be the 3D movement signal according to various conditions. A detailed structure of the determination unit 110 will be described later with reference to FIG. 2.

For example, the determination unit 110 may determine that the control signal is the 3D movement signal when the control signal corresponds to a movement of the touch device which follows a predetermined trace such as a circular trace or a rectilinear trace. That is, if the user moves the touch device according to the predetermined trace such as the circular trace or the rectilinear trace, with the touch device in contact with the touch surface, the determination unit 110 determines that the pointer is not moved on the 2D coordinate plane but is moved to the point in the 3D space. An example with respect to moving the pointer to the point in the 3D space will now be described.

When the user draws a circle on the touch surface by using the touch device, a control signal corresponding to a user input is generated. The determination unit 110 determines that the control signal, which corresponds to a movement of the pointer following the circular trace, is the 3D movement signal, thereby controlling the pointer to be moved to a point in the 3D space. When the control signal corresponds to a movement of the touch device following a circular trace in a first direction, the pointer movement unit 120 moves the pointer to a point in the 3D space existing in a positive direction perpendicular to the 2D coordinate plane. On the other hand, when the control signal corresponds to a movement of the touch device following a circular trace in a second direction, the pointer movement unit 120 moves the pointer to a point in the 3D space existing in a negative direction perpendicular to the 2D coordinate plane.

The first direction may be a clockwise direction and the second direction may be a counterclockwise direction, or vice versa. Also, the positive direction may be an upper part of the 2D coordinate plane and the negative direction may be a lower part of the 2D coordinate plane, or vice versa. When the pointer moves to a point in the 3D space, the 2D coordinate plane is also changed in correspondence with the movement of the pointer.

When the user repeatedly draws a rectilinear line on the touch surface by using the touch device, a control signal corresponding to a user input is generated. The determination unit 110 determines that the control signal, which corresponds to a movement of the touch device following the rectilinear trace, is the 3D movement signal, thereby controlling the pointer to be moved to a point in the 3D space. When the control signal corresponds to a movement of the touch device following a rectilinear trace in a third direction, the pointer movement unit 120 moves the pointer to a point in the 3D space existing in a positive direction perpendicular to the 2D coordinate plane. On the other hand, when the control signal corresponds to a movement of the touch device following a rectilinear trace in a fourth direction, the pointer movement unit 120 moves the pointer to a point in the 3D space existing in a negative direction perpendicular to the 2D coordinate plane. The third direction may be a right and left direction, and the fourth direction may be an up and down direction, or vice versa.

A direction perpendicular to the 2D coordinate plane in the present invention indicates a normal vector direction from a point where the pointer exists. In the case where the 2D coordinate plane is flat, the direction perpendicular to the 2D coordinate plane is described by using a rectangular coordinate system. In the case where the 2D coordinate plane is spherical, the direction perpendicular to the 2D coordinate plane is described by using a spherical coordinate system.

In the case where the touch surface is flat, the 3D space may be represented by using the rectangular coordinate system. The rectangular coordinate system forms the 3D space according to three rectilinear lines which respectively correspond to an X-axis, a Y-axis, and a Z-axis. In the rectangular coordinate system, each rectilinear line is perpendicular to two other rectilinear lines, and a flat plane formed by the X-axis and the Y-axis is assumed to be the touch surface. Thus, the 2D coordinate plane in the beginning is the flat plane which is formed by the X-axis and the Y-axis, and whose Z-coordinate is 0. The direction perpendicular to the 2D coordinate plane passes the point where the pointer exists, and is related to a rectilinear line parallel to the Z-axis. When the 3D movement signal is input, the pointer moves to a point in the 3D space according to the corresponding rectilinear line, thus, X and Y coordinates of the moved pointer are not changed but only the Z-coordinate is changed.

In the case where the touch surface is spherical, the 3D space may be represented by using the spherical coordinate system. The spherical coordinate system forms the 3D space according to a $\rho$-axis, a $\theta$-axis and a $\phi$-axis. A $\rho$-coordinate indicates a distance from an origin point to a given point. A $\theta$-coordinate indicates an angle in a positive direction from the X-axis of the rectangular coordinate system. A $\phi$-coordinate indicates an angle with the Z-axis in the rectangular coordinate system. In the spherical coordinate system, the touch surface is assumed to be a spherical plane which exists at a location distant up to a predetermined distance ($\rho 1$) from the origin point, and which is formed by the $\theta$-axis and the $\phi$-axis. Thus, the 2D coordinate plane in the beginning is the spherical plane which is formed by the $\theta$-axis and the $\phi$-axis, and whose $\rho$-coordinate is $\rho 1$. The direction perpendicular to the 2D coordinate plane indicates a direction of a rectilinear line which connects the location of the pointer, and the origin point. When the 3D movement signal is input, the pointer moves to a point in the 3D space according to the corresponding rectilinear line, thus, the $\theta$ and $\phi$ coordinates of the moved pointer are not changed but only the $\rho$-coordinate is changed.

Hence, the point, in the 3D space, existing in a direction perpendicular to the 2D coordinate plane indicates a point in the 3D space, wherein the point is generated by moving the pointer in the normal vector direction. Also, the positive direction may be an upper part of the 2D coordinate plane and a negative direction may be a lower part of the 2D coordinate plane, or vice versa.

When the pointer reaches a desired location in the 3D space, the user may select an object at the location where the pointer exists. In the present invention there may be a plurality of user selectable objects which are in a displayed image. For example, the object may be an icon, a selection menu, or the like. It is assumed that the user may double-click the touch surface, thereby enabling selection of the object at the location where the pointer exists. With respect to the object selection, the 3D location input apparatus 100 according to the present invention may further include a selection signal receiving unit (not shown), an object determination unit (not shown), and an object selection unit (not shown).

When the user double-clicks the touch surface, a selection signal for selecting the object is generated. The selection signal receiving unit (not shown) receives the selection signal.

The object determination unit (not shown) determines whether the object exists at the location where the pointer exists. If the object exists at the location where the pointer exists, the object selection unit (not shown) selects the corresponding object. However, if the object does not exist at the location where the pointer exists, the object selection unit (not shown) moves the pointer to a predetermined location.

According to other embodiments, the predetermined location, to which the pointer is moved, may be set in various ways, such as a reference point on the touch surface, a point on the touch surface to which the pointer is moved in the Z-axis direction, and the like. By doing so, the user may rapidly move the pointer to the predetermined location in the 2D coordinate plane.

Figure 2:
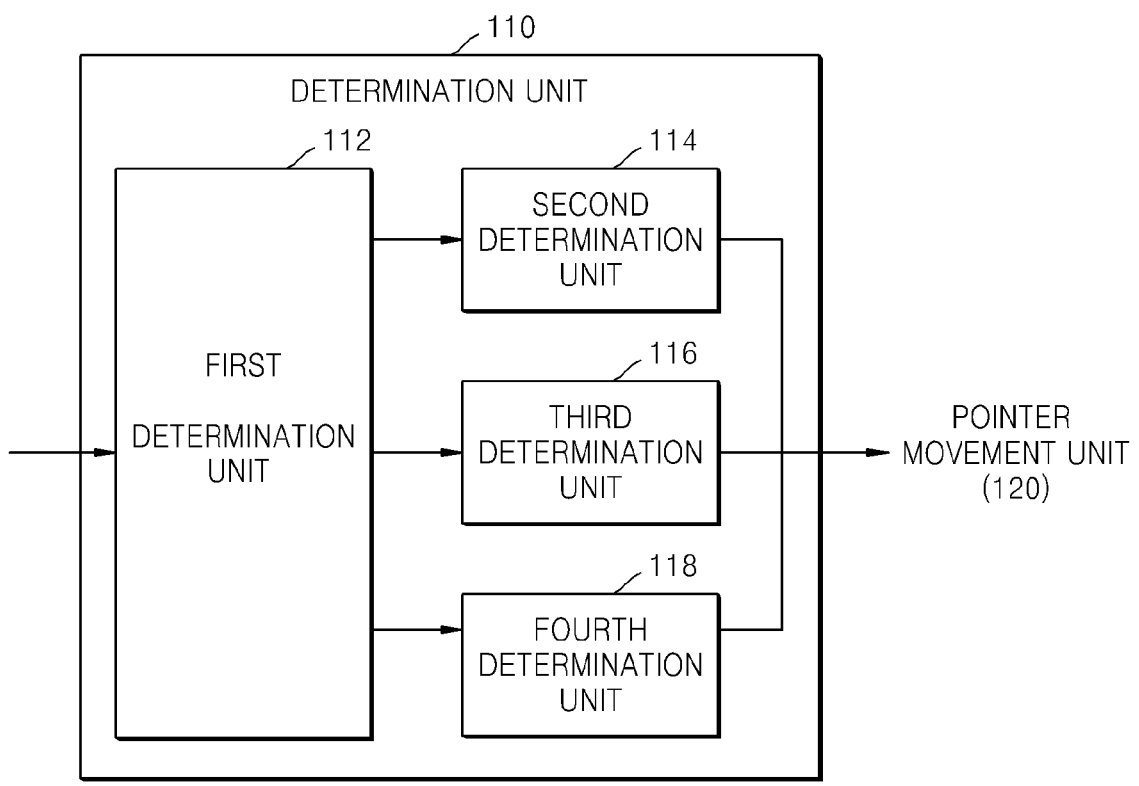
FIG. 2 is a block diagram for illustrating a detailed structure of a termination unit of FIG. 1.

FIG. 2 is a block diagram for illustrating the detailed structure of the determination unit 110.

According to a kind of a control signal, a user may move a pointer along a 2D plane, or may move the pointer to a point in a 3D space, by using the 3D location input apparatus 100 according to the present invention. Thus, it has to be determined whether the control signal generated by a user input is a 3D movement signal, according to predetermined conditions.

The determination unit 110 may include a first determination unit 112, a second determination unit 114, a third determination unit 116, and a fourth determination unit 118.

The first determination unit 112 determines whether the control signal is the 3D movement signal, according to whether the control signal corresponds to a movement of the touch device following a predetermined trace. When the control signal corresponds to the movement of the touch device which follows a predetermined trace such as a circular trace or a rectilinear trace, the first determination unit 112 determines the control signal to be the 3D movement signal.

The second determination unit 114 determines whether the control signal is the 3D movement signal, according to whether the control signal corresponds to a movement of the touch device in a threshold range. When the predetermined trace is assumed to be the circular trace, the user rarely desires to move the touch device according to a small-sized circle. Thus, when the control signal corresponds to the movement of the touch device in the predetermined threshold range, the second determination unit 114 determines that the control signal is the 3D movement signal.

For example, the second determination unit 114 determines a control signal to be the 3D movement signal, wherein the control signal is generated when the user draws a circle, which is less than 1 centimeter (cm) in diameter, on the touch surface in a clockwise direction. Thus, the pointer movement unit 120 moves the pointer to a point in the 3D space existing in a direction perpendicular to the touch surface, in proportion to the number of times that the circle is drawn. On the other hand, when the user draws a circle greater than 1 cm in diameter in the clockwise direction, the second determination unit 114 determines that the control signal is not the 3D movement signal. Hence, the pointer movement unit 120 rotates the pointer in the circular trace on the touch surface.

The third determination unit 116 determines whether the control signal is the 3D movement signal, according to whether a 3D image is displayed when the control signal is input. In the case where a 2D image is displayed in a display unit (not shown), a 3D location input function is unnecessary. Thus, although the first determination unit 112 has determined the control signal to be a 3D location input signal, if the 2D image is displayed on the display unit (not shown), the pointer moves according to a 2D coordinate plane.

The fourth determination unit 118 determines whether the control signal is the 3D movement signal, according to whether a movement of the touch device corresponding to the control signal is repeatedly performed in a predetermined trace over the threshold number of times.

For example, it is assumed that the fourth determination unit 118 has been designed so as to determine a 3D location input only when the user draws a circle over two times in a clockwise direction on the touch surface. In this regard, when the user takes off his or her hand from the touch surface after drawing the circle once, the pointer rotates once on the touch surface. However, when the user draws the circle over two times, the pointer moves to the point in the 3D space existing in the direction perpendicular to the touch surface. At this time, a movement amount of the pointer is determined in proportion to the number of times that the user consecutively draws the circle on the touch surface. Thus, if the user draws the circle twice, a coordinate value of the Z-axis is increased up to 1 (or, 2), and if the user draws the circle three times, the coordinate value of the Z-axis is increased up to 2 (or, 3).

The pointer movement unit 120 moves the pointer along the 2D coordinate plane, or moves the pointer to the point in the 3D space, according to results of the determinations from the first determination unit 112, the second determination unit 114, the third determination unit 116, and the fourth determination unit 118. That is, at least one of the first determination unit 112, the second determination unit 114, the third determination unit 116, and the fourth determination unit 118 determines that the control signal is for a 2D location input of the pointer, the pointer movement unit 120 moves the pointer on the touch surface, according to the control signal. On the other hand, all of the first determination unit 112, the second determination unit 114, the third determination unit 116, and the fourth determination unit 118 determine that the control signal is for the 3D location input of the pointer, the pointer movement unit 120 moves the pointer to the point in the 3D space existing in the direction perpendicular to the 2D coordinate plane.

The determination unit 110 according to the present invention does not have to include all of the first determination unit 112, the second determination unit 114, the third determination unit 116, and the fourth determination unit 118. The first determination unit 112, the second determination unit 114, the third determination unit 116, and the fourth determination unit 118 may be appropriately associated according to embodiments. Also, in the above described embodiment, the determination unit 110 determines whether each control signal is the 3D movement signal. However, according to other embodiments, when a control signal determined to be the 3D movement signal is input, an input mode is switched to a 3D location input mode so that a next control signal may be determined to be the 3D movement signal although the next control signal does not satisfy a condition with respect to the 3D movement signal. At this time, in the case where the control signal satisfies a specific condition, the input mode may be switched to a 2D location input mode.

Figure 3A:
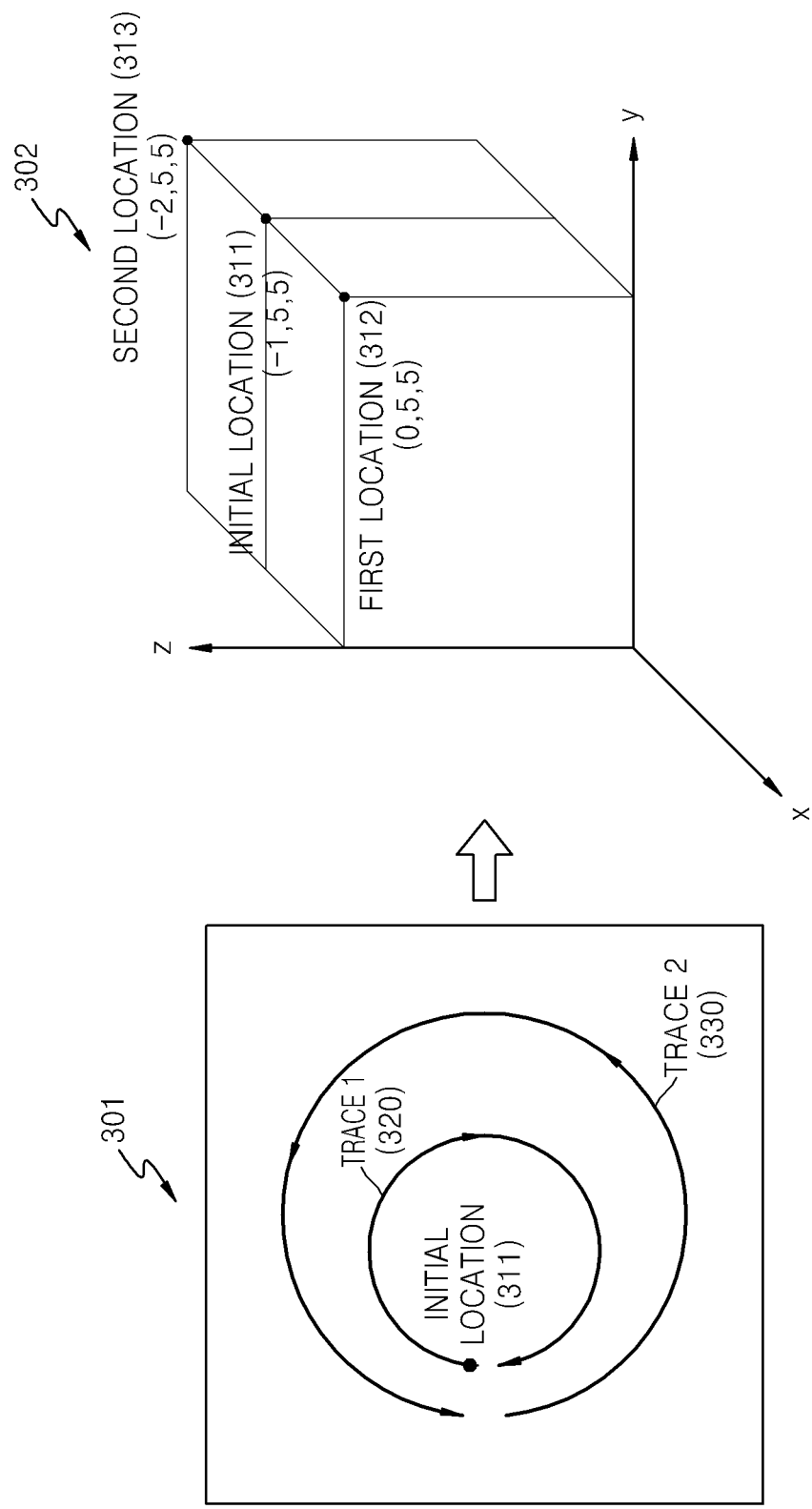
FIG. 3A is a diagram for illustrating a 3D location input with respect to user manipulation of a touch screen, according to an embodiment of the present invention.

FIG. 3A is a diagram for illustrating a 3D location input with respect to user manipulation of a touch screen, according to an embodiment of the present invention. In FIG. 3A, a control signal corresponding to a movement of a touch device following a circular trace is determined to be a 3D movement signal. Meanwhile, a left diagram 301 in FIG. 3A indicates the user manipulation of the touch screen, and a right diagram 302 in FIG. 3A three-dimensionally indicates a location of the pointer. A touch surface of the right diagram 302 exists in a Y-Z flat plane.

In a current point of view, since the pointer is located at an initial location 311, a 2D coordinate plane where the pointer exists is the Y-Z flat plane whose X-coordinate is −1.

Since the control signal, generated when a user draws a circle in a clockwise direction according to a trace 1 320, is the 3D movement signal, the pointer moves to an upper part or a lower part with respect to the touch surface. It is assumed that the pointer moves to the upper part of the touch surface when the user draws the circle in the clockwise direction. Thus, the pointer moves from the initial location 311 to a first location 312. Referring to the right diagram 302, a coordinate of the pointer is moved from (−1, 5, 5) to (0, 5, 5).

The user draws the circle twice in a counterclockwise direction according to a trace 2 330. The pointer moves from the first location 312 to the lower part of the touch surface. Since the pointer moves in proportion to the number of times that the user draws the circle, the pointer moves to a second location 313.

Figure 3B:
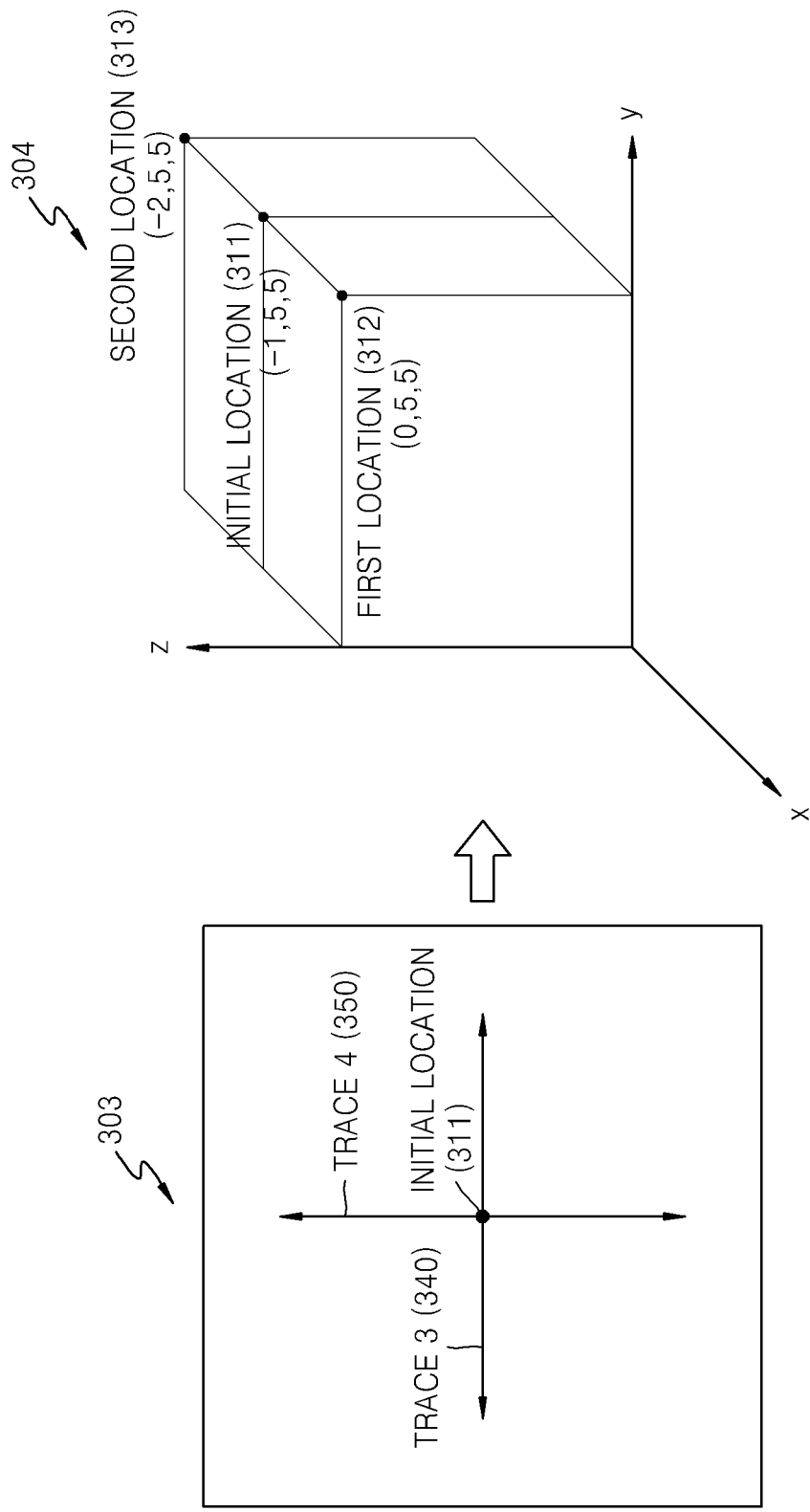
FIG. 3B is a diagram for illustrating a 3D location input with respect to user manipulation of a touch screen, according to another embodiment of the present invention.

FIG. 3B is a diagram for illustrating a 3D location input with respect to user manipulation of a touch screen, according to another embodiment of the present invention. In FIG. 3B, a control signal corresponding to a movement of a touch device following a rectilinear trace is determined to be a 3D movement signal.

Meanwhile, a left diagram 303 in FIG. 3B indicates the user manipulation of the touch screen, and a right diagram 304 in FIG. 3B three-dimensionally indicates a location of the pointer. A touch surface of the right diagram 302 exists in a Y-Z flat plane.

In a current point of view, since the pointer exists at an initial location 311, a 2D coordinate plane where the pointer exists is the Y-Z flat plane whose X-coordinate is −1.

It is assumed that the pointer moves to the upper part of the touch surface when the user moves a touch device according to a left and right trace 3 340, and the pointer moves to the lower part of the touch surface when the user moves a touch device according to an up and down trace 4 350. In one embodiment of the invention, in the case of the left and right trace 3 340, the touch device is firstly moved toward the left direction from the initial location 311 in the left diagram 303 and then moved toward the right direction while passing through the initial location 311. In an alternative embodiment, the touch device is firstly moved toward the right direction and then moved toward the left direction in the manner described above. Similarly, for the case of the up and down trace 4 350, the pointer is firstly moved in the up direction from the initial location 311 in the left window 303 and then moved past the initial location 311 in a down motion. In an alternative embodiment, the touch device is firstly moved downward and then moved upward in the manner described above.

When the user moves a touch device according to a left and right trace 3 340, the pointer moves from the initial location 311 to a first location 312. Thus, the pointer locates at coordinates (0, 5, 5). While the pointer is located at the first location 312, if the user moves the touch device twice according to an up and down trace 4 350, the pointer moves to a second location 313. Thus, the pointer exists at coordinates (−2, 5, 5).

Figure 4:
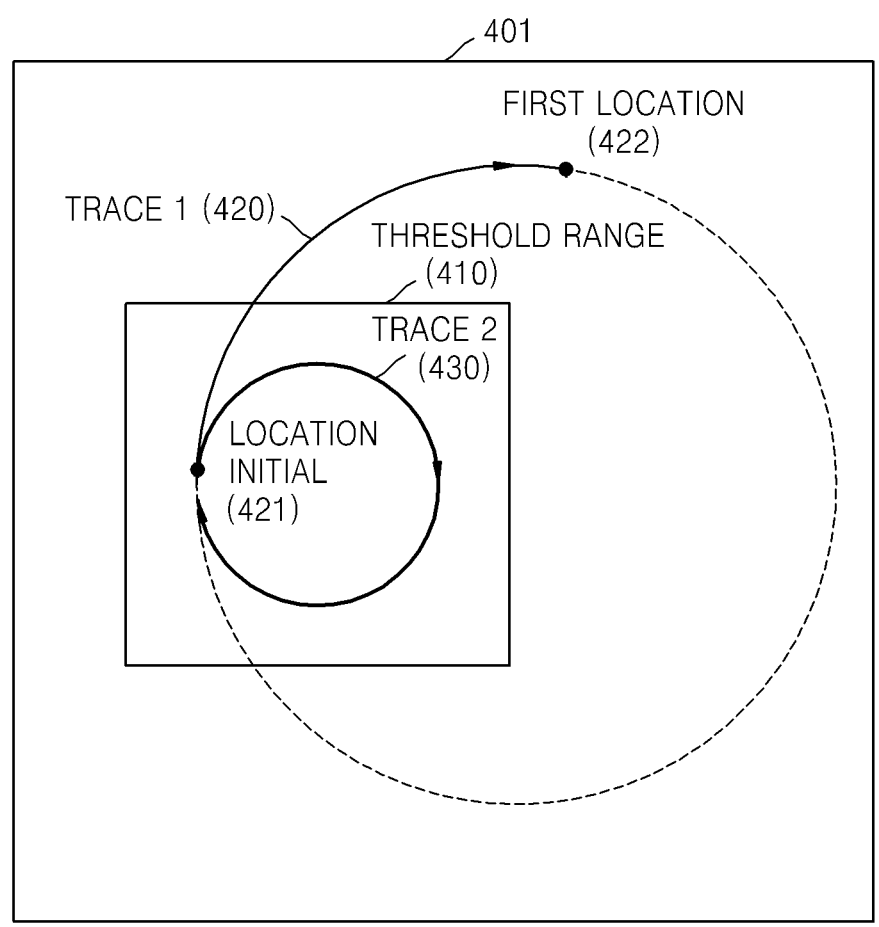
FIG. 4 is a diagram for illustrating operations of a pointer movement unit including a second determination unit, according to another embodiment of the present invention.

FIG. 4 is a diagram for illustrating operations of the pointer movement unit 120 including the second determination unit 114, according to another embodiment of the present invention.

When a user touches a touch surface 401, a pointer locates at an initial location 421. The second determination unit 114 previously described with reference to FIG. 2 determines that a control signal corresponding to a movement of the touch device in a threshold range is a 3D movement signal.

In the case where the user moves a touch device from the initial location 421 to a first location 422 according to a trace 1 420, with the touch device being touched on the touch surface 401, since the first location 422 is outside a threshold range 410, the second determination unit 114 determines that a user input is a 2D location input. Although the user moves the touch device according to a circular trace passing through the first location 422, this user input is determined to be the 2D location input. Thus, the pointer from the initial location 421 moves back to the initial location 421 via the first location 422. Consequently, the pointer moves according to the touch surface 401.

Next, the user moves the touch device according to a trace 2 430, with the touch device being touched on the touch surface 401. Since the trace 2 430 is within the threshold range 410, the second determination unit 114 determines that a user input is a 3D location input. Thus, the pointer moves to an upper part or a lower part with respect to the touch surface 401.

The threshold range 410 may be set to be small so as to make determination easy, wherein the determination is related to whether the user input is for the 2D location input, or for the 3D location input. However, if the threshold range 410 is set to be small, the 3D location input by the user becomes difficult. Thus, the threshold range 410 has to be set to have an appropriate size according to embodiments.

Figure 5:
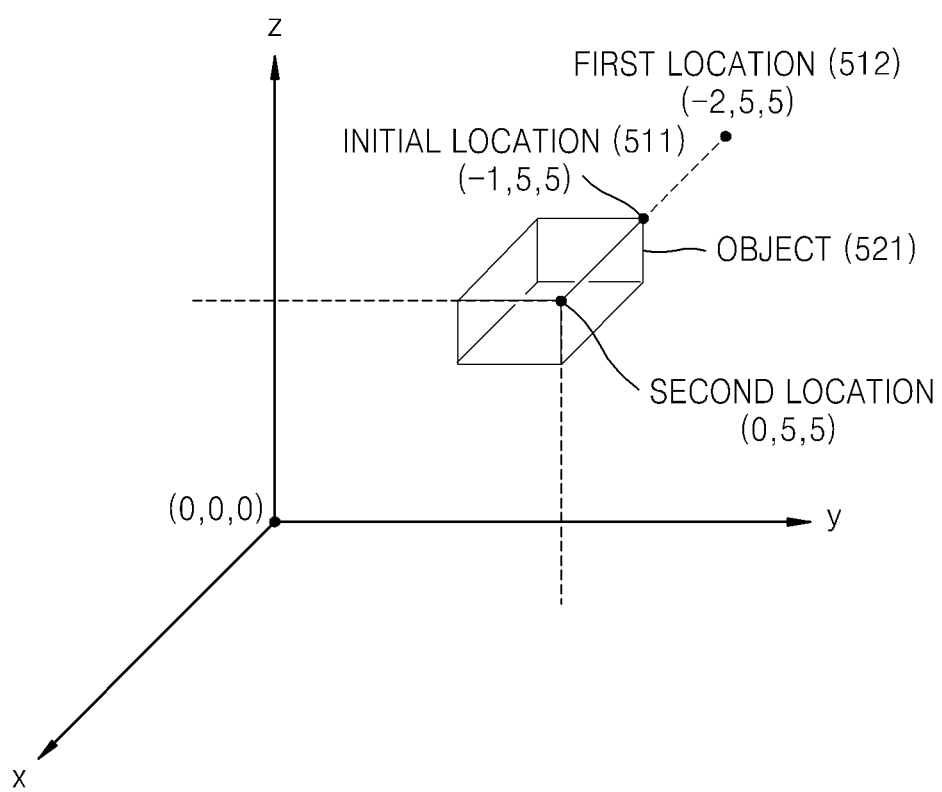
FIG. 5 is a diagram for illustrating operations of an object selection unit (not shown), according to another embodiment of the present invention.

FIG. 5 is a diagram for illustrating operations of the object selection unit (not shown), according to another embodiment of the present invention. FIG. 5 three-dimensionally illustrates a current location, and a touch surface exists in a Y-Z flat plane.

First, it is assumed that a pointer exists at an initial location 511. A user selects the initial location 511. Also, it is assumed that a selection signal, for selecting an object at a location where the pointer exists, is generated when the user double-clicks the touch surface. Since an icon exists at the location where the pointer exists, the object selection unit (not shown) activates an icon 521.

Next, it is assumed that the pointer exists at a first location 512. When the user double-clicks the touch surface, the selection signal is generated. However, since the icon 521 does not exist at the first location 512, the object selection unit (not shown) moves the pointer to a predetermined location. For example, the object selection unit (not shown) may move the pointer from the first location 512 to a second location 513, to an origin point (0, 0, 0), or to an arbitrary reference point.

Figure 6:
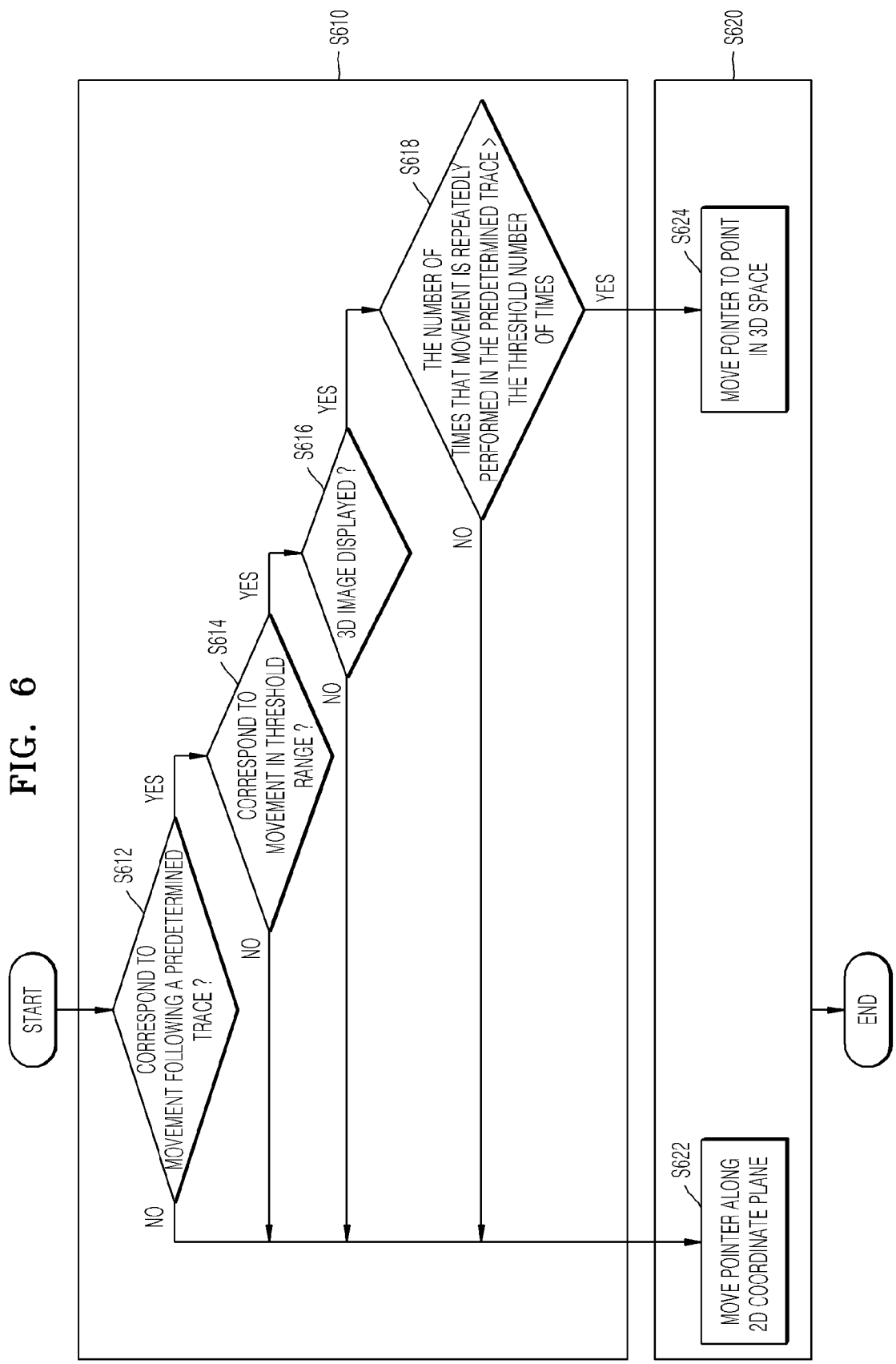
FIG. 6 is a flowchart of a method of inputting a 3D location, according to another embodiment of the present invention.

FIG. 6 is a flowchart of a method of inputting a 3D location, according to another embodiment of the present invention.

In operation S610, it is determined whether a control signal for moving a pointer at a point in a 2D coordinate plane is a 3D movement signal for moving the pointer into a 3D space. The control signal may be generated in correspondence with a user input via a touch screen. The touch screen may include a touch surface on which an image is displayed, and a sensor detecting a contact with the touch surface.

Operation S610 may be realized via at least one of operations S612 though S618.

In operation S612, it is determined whether the control signal corresponds to a movement of the touch device following a predetermined trace. When the control signal corresponds to the movement, operation S614 is performed. When the control signal does not correspond to the movement, operation S622 is performed.

In operation S614, it is determined whether the control signal corresponds to a movement of the touch device in a threshold range. When the control signal corresponds to the movement, operation S616 is performed. When the control signal does not correspond to the movement, operation S622 is performed.

In operation S616, it is determined whether a 3D image is displayed when the control signal is input. When the 3D image is displayed, operation S618 is performed. When a 2D image is displayed, operation S622 is performed.

In operation S618, it is determined whether the movement of the touch device corresponding to the control signal is repeatedly performed in a predetermined trace over the threshold number of times. When the movement is repeatedly performed over the threshold number of times, operation S624 is performed. When the movement is repeatedly performed below the threshold number of times, operation S622 is performed.

In operation S620, the pointer is selectively moved to a point in the 3D space, according to a result of the determination.

When the control signal is determined to be the 3D movement signal, the pointer is moved to the point in the 3D space existing in a direction perpendicular to the 2D coordinate plane, according to the control signal (operation S624). On the other hand, when the control signal is determined not to be the 3D movement signal, the pointer is moved along the 2D coordinate plane, according to the control signal (operation S624).

The present invention enables a 3D location input by using a conventional 2D location input apparatus, without addition of a separate device, and can be easily applied to the conventional 2D location input apparatus.

The present invention determines a specific signal to be a 2D location input signal and a 3D location input signal according to a predetermined condition, thereby enabling the efficient performance of the 3D location input by using the conventional 2D location input apparatus.

The embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.), and optical recording media (e.g., CD-ROMs, or DVDs). In another embodiment, the computer readable recording medium may include storage media such as carrier waves (e.g., transmission through the Internet).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of inputting a three-dimensional (3D) location using a touch surface interface for generating a control signal, the method comprising:
   determining whether the control signal is a 3D movement signal for moving a pointer existing at a point in a two-dimensional (2D) coordinate plane into a 3D space; and
   based on a result of the determining, selectively moving the pointer to a point in the 3D space existing in a direction perpendicular to the 2D coordinate plane, according to the control signal,
   wherein the determining comprises determining the control signal is the 3D movement signal, when the control signal corresponds to a movement of a user following a predetermined shape in a 2D coordinate plane on the touch surface interface.

2. The method of claim 1, wherein the determining further comprises determining whether the control signal is the 3D movement signal, according to whether the control signal corresponds to the movement of the user in a threshold range.

3. The method of claim 1, wherein the determining further comprises determining whether the control signal is the 3D movement signal, according to whether a 3D image is displayed when the control signal is input.

4. The method of claim 1, wherein the determining further comprises determining whether the control signal is the 3D movement signal, according to whether the movement of the user corresponding to the control signal is repeatedly performed in the predetermined shape over a threshold number of times.

5. The method of claim 1, wherein the predetermined shape is at least one of a circular shape and a rectilinear shape.

6. The method of claim 5, wherein the selectively moving comprises:
   if the control signal corresponds to the movement of the user following the rectilinear shape in a left and right direction, moving the pointer to a point in the 3D space existing in a positive direction perpendicular to the 2D coordinate plane; and
   if the control signal corresponds to the movement of the user following the rectilinear shape in an up and down direction, moving the pointer to a point in the 3D space existing in a negative direction perpendicular to the 2D coordinate plane.

7. The method of claim 5, wherein the selectively moving comprises:
   if the control signal corresponds to the movement of the user following the circular shape in a clockwise direction, moving the pointer to a point in the 3D space existing in a positive direction perpendicular to the 2D coordinate plane; and
   if the control signal corresponds to the movement of the user following the circular shape in a counterclockwise direction, moving the pointer to a point in the 3D space existing in a negative direction perpendicular to the 2D coordinate plane.

8. The method of claim 1, wherein the selectively moving comprises, if the control signal is determined not to be the 3D movement signal, moving the pointer along the 2D coordinate plane according to the control signal.

9. The method of claim 1, further comprising:
   receiving a selection signal for selecting one object that is one of a plurality of selectable objects in a displayed image;
   determining whether the one object exists at a location where the pointer exists; and
   if the one object exists at the location where the pointer exists, selecting the one object, and if the one object does not exist at the location where the pointer exists, moving the pointer to a predetermined location in the 2D coordinate plane.

10. The method of claim 1, wherein the touch surface is on a touch screen, and the control signal is generated according to an input to the touch screen comprising the touch surface on which an image is displayed and a sensor detecting a contact with the touch surface.

11. A computer readable recording medium having recorded thereon a program for executing the method of claim 1.

12. The method of claim 1, wherein the movement of the user is one of a movement of a device moved by a user and a movement of a user's finger.

13. A three-dimensional (3D) location input apparatus for inputting a 3D location using a touch surface, the 3D location input apparatus comprising:
    a determination unit which determines whether a control signal for moving a pointer existing at a point in a two-dimensional (2D) coordinate plane is a 3D movement signal for moving the pointer into a 3D space; and
    a pointer movement unit, based on a result of the determining, which selectively moves the pointer to a point in the 3D space existing in a direction perpendicular to the 2D coordinate plane, according to the control signal,
    wherein the determination unit comprises a first determination unit which determines the control signal is the 3D movement signal, when the control signal corresponds to a movement of a user following a predetermined shape in a 2D coordinate plane on the touch surface.

14. The 3D location input apparatus of claim 13, wherein the determination unit further comprises a second determination unit which determines whether the control signal is the 3D movement signal, according to whether the control signal corresponds to the movement of the user in a threshold range.

15. The 3D location input apparatus of claim 13, wherein the determination unit further comprises a third determination unit which determines whether the control signal is the 3D movement signal, according to whether a 3D image is displayed when the control signal is input.

16. The 3D location input apparatus of claim 13, wherein the determination unit further comprises a fourth determination unit which determines whether the control signal is the 3D movement signal, according to whether the movement of the user corresponding to the control signal is repeatedly performed in the predetermined shape over a threshold number of times.

17. The 3D location input apparatus of claim 13, wherein the predetermined shape is at least one of a circular shape and a rectilinear shape.

18. The 3D location input apparatus of claim 17, wherein the pointer movement unit comprises a 3D location movement unit which moves the pointer to a point in the 3D space existing in a positive direction perpendicular to the 2D coordinate plane if the control signal corresponds to the movement of the user following the rectilinear shape in a left and right direction, and which moves the pointer to a point in the 3D space existing in a negative direction perpendicular to the 2D coordinate plane if the control signal corresponds to the movement of the user following the rectilinear shape in an up and down direction.

19. The 3D location input apparatus of claim 17, wherein the pointer movement unit comprises the 3D location movement unit which moves the pointer to a point in the 3D space existing in a positive direction perpendicular to the 2D coordinate plane if the control signal corresponds to the movement of the user following the circular shape in a clockwise direction, and which moves the pointer to a point in the 3D space existing in a negative direction perpendicular to the 2D coordinate plane if the control signal corresponds to the movement of the user following the circular shape in a counterclockwise direction.

20. The 3D location input apparatus of claim 13, wherein the pointer movement unit comprises a 2D location movement unit which moves the pointer along the 2D coordinate plane according to the control signal if the control signal is determined not to be the 3D movement signal.

21. The 3D location input apparatus of claim 13, further comprising:
- a display unit on which an image is displayed;
- a selection signal receiving unit which receives a selection signal for selecting an object that is one of a plurality of selectable objects in the image displayed in the display unit;
- an object determination unit which determines whether the object exists at a location where the pointer exists; and
- an object selection unit which selects the object if the object exists at the location where the pointer exists, and which moves the pointer to a predetermined location in the 2D coordinate plane if the object does not exist at the location where the pointer exists.

22. The 3D location input apparatus of claim 13,
- wherein the touch surface is provided on a touch screen on which an image is displayed and a sensor detecting a contact with the touch surface; and
- a control signal generation unit which generates the control signal according to an input into the touch screen.

23. The 3D location input apparatus of claim 13, wherein the movement of the user is one of a movement of a device moved by a user and a movement of a user's finger.

* * * * *